United States Patent [19]

Ogata

[11] 4,084,221
[45] Apr. 11, 1978

[54] HIGH-VOLTAGE THYRISTOR CONVERTER

[75] Inventor: Fumio Ogata, Hitachi, Japan

[73] Assignee: Hitachi, Ltd., Japan

[21] Appl. No.: 744,322

[22] Filed: Nov. 23, 1976

[30] Foreign Application Priority Data

Dec. 5, 1975   Japan ................. 50-144009

[51] Int. Cl.$^2$ ............................................. H02M 1/18
[52] U.S. Cl. ...................................... 363/54; 363/68;
363/85
[58] Field of Search ................. 307/252 L, 252 Q;
321/11, 14, 16, 18, 27 R; 363/52, 53, 54, 55, 56,
84, 85, 68

[56] References Cited

U.S. PATENT DOCUMENTS

| 3,593,038 | 7/1971 | Hylten-Cavallius et al. ... 307/252 L |
| 3,842,337 | 10/1974 | Ekstrom et al. ................. 321/27 R |
| 3,878,451 | 4/1975 | Ostlund et al. ............. 307/252 L X |
| 3,962,624 | 6/1976 | Ostlund et al. .................. 321/27 R |

FOREIGN PATENT DOCUMENTS 1,269,502   4/1972   United Kingdom ............ 307/252 L

*Primary Examiner*—William M. Shoop
*Attorney, Agent, or Firm*—Craig & Antonelli

[57] ABSTRACT

A high-voltage thyristor converter having a plurality of series-connected thyristor units and a gate control system. Each of the series-connected thyristor units has a plurality of series-connected thyristors and a gate-drive power supply circuit (hereinafter referred to as a gate power supply) connected between both extreme ends of the series-connected thyristors for supplying gate-drive power to the thyristors. The gate control system detects whether or not an output voltage of the gate power supply of at least one of the series-connected thyristor units is at least equal to or higher than a predetermined value and transmits a gate signal simultaneously to all of the thyristors when the output voltage is higher than the predetermined value, so that a protective action for preventing breakdown of the thyristors can be performed upon an instantaneous power failure or the like trouble.

13 Claims, 3 Drawing Figures

HIGH-VOLTAGE THYRISTOR CONVERTER

The present invention relates to a high-voltage thyristor converter and more particularly to a high-voltage thyristor converter having a plurality of series-connected thyristor units, each of which is provided with a plurality of series-connected thyristors and a gate-drive power supply circuit (hereinafter referred to as a gate power supply) connected with both extreme ends of the series-connected thyristors so that gate-drive power for firing the thyristors can be derived from both the extreme ends of the series-connected thyristors.

Generally, the conventional high-voltage thyristor converters are classified into two types of the converters. One is provided with such a circuit arrangement that a gate current is supplied to thyristor elements from a separate power supply which is isolated from a high-potential section of the converter by means of using an isolation power transformer or isolation pulse transformer. The other is provided with such a circuit arrangement that gate-drive power derived from both the extreme ends of the series-connected thyristors is rectified, stored in a capacitor while being kept constant in voltage, and then used to supply a gate current to the thyristor elements by means of on-off operation of a semiconductor switch in response to a gate signal from a control system. Therefore, the former is not suitable for use in a high-voltage thyristor converter, though it can provide stable power supply and, on the other hand, the latter has such a disadvantage that it is difficult to provide stable supply of gate-drive power at the time of occurrence of voltage drop in the main circuit or restoration of an instantaneous power failure. In the latter, there are provided with a plurality of series-connected thyristor units, each of which has a plurality of series-connected thyristors and a gate power supply circuit. For instance, in the case where a DC conversion output of 125KV is to be obtained, there are provided with ten thyristor units connected in series, each of which has twelve series-connected thyristors. At the time of occurrence of voltage drop in the main circuit or restoration of an instantaneous power failure, the output voltage of the gate power supply of each of the series-connected thyristor units is increased or decreased at the same rate in the case where there is a difference in a gate impedance or the like among the series-connected thyristor units, so that it is likely that a gate current of different magnitude may be supplied to each of the series-connected thyristors and, therefore, the time delay of fire of each of the series-connected thyristors is increased at a different rate. As a result, an increased switching power due to shortage of a gate current or unbalance of gate-drive voltage applied to each of the thyristors at the time of turn-on operation of the thyristors may cause breakdown of the thyristors.

Accordingly, it is an object of the present invention to provide a high-voltage thyristor converter which is capable of performing a protective operation without breakdown of any thyristors in the case of occurrence of an instantaneous power failure or the like trouble.

According to the present invention, there is provided a high-voltage thyristor converter which is provided with high-voltage converter means and gate control means. The high-voltage converter means has a plurality of series-connected thyristor units, each of which is provided with a plurality of series-connected thyristors and a gate-drive power supply circuit connected between both the extreme ends of the series-connected thyristors for supplying a gate-drive power to the thyristors. The gate control means detects whether or not an output voltage of the gate-drive power supply circuit of at least one of the thyristor units is at least equal to or higher than a predetermined voltage value and transmits a gate signal simultaneously to all of the thyristor units only when the output voltage is at least equal to or higher than the predetermined voltage value.

The above and other objects, features and advantages will be made apparent by the detailed description taken in conjunction with the accompanying drawings, in which.

The embodiments of the present invention will be described below with reference to the accompanying drawings.

Figure 1:
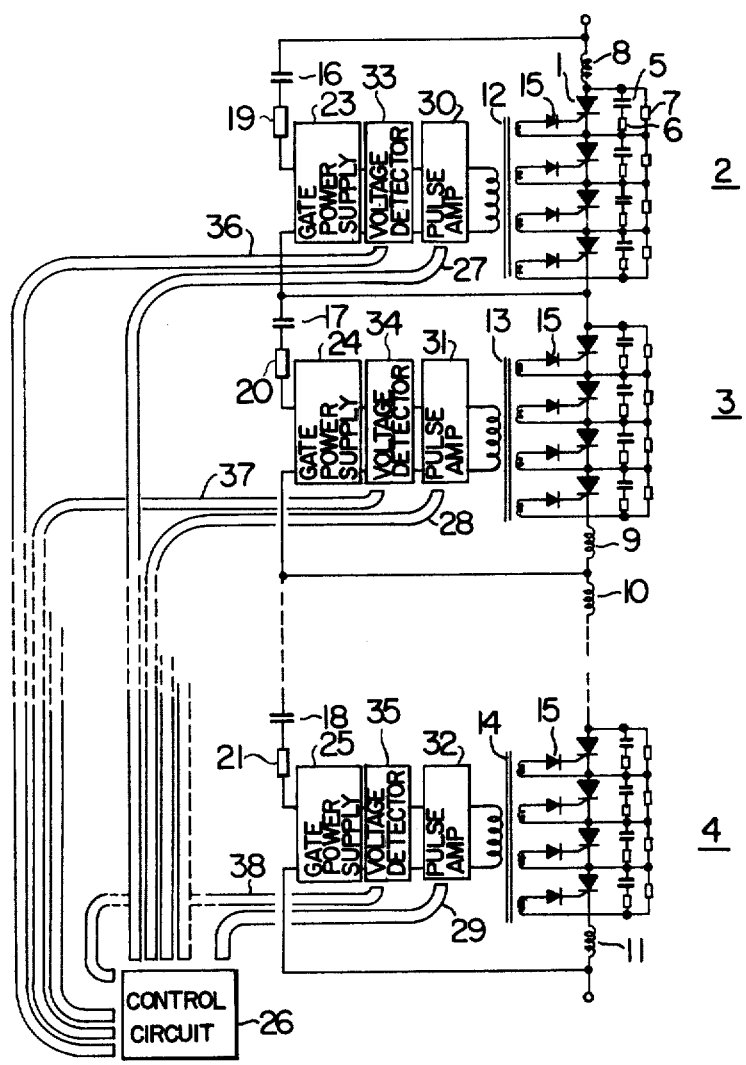
FIG. 1 is a circuit configuration diagram showing the high-voltage thyristor converter according to one embodiment of the present invention.

The one embodiment of the invention is shown in FIG. 1. In the drawing, a plurality of thyristors 1 making up one of thyristor arms in a bridge circuit of a high-voltage thyristor converter are grouped into a plurality of thyristor units 2 and 4. Each of the thyristors 1 is connected in parallel to a resistor 7 and a series-connected circuit of a capacitor 5 and a resistor 6 thereby to divide the voltage applied to the thyristors 1. In this embodiment, the respective thyristor units have reactors 8 to 11 connected in series therewith for dampening the variation in the current flowing in the thyristors 1. A gate signal is supplied to each gate of the thyristors 1 via a rectifying diode 15 from pulse transformers 12 to 14 provided for the respective thyristor units 2 to 4. The gate signal is derived from gate power supplies 23 to 25 each connected between both extreme ends of each thyristor group of the respective thyristor units through the capacitors 16 to 18 and the resistors 19 to 21. Although power is derived from all the thyristors of each thyristor unit in this embodiment, this is not an absolute necessity. Signals from the control circuit 26 are transmitted to pulse amplifiers 30 to 32 respectively by light guides 27 to 29, and after being converted into signals of appropriate pulse width, applied to pulse transformers 12 to 14, respectively. The voltages across the gate power supplies 23 to 25 are monitored by voltage level detectors 33 to 35, respectively. Signals carrying information as to whether or not the voltages across the gate power supplies 23 to 25 are higher than a predetermined level are applied through the light guides 36 to 38 to the control circuit 26.

In this way, insulation is facilitated by deriving power for the gate power supplies 23 to 25 from both the extreme ends of the series-connected thyristors making up each thyristor arm. Further, the fact that the signals from and to the control circuit 26 are transmitted by means of the light guides 27 to 29 and 36 to 38 permits the control circuit 26 to be disposed either on the ground or at a point of appropriate potential as desired.

The operation of the foregoing circuit arrangement will be explained below.

As long as a required voltage is applied for operation of the thyristor arms, the voltage level detectors 33 to 35 detect that each output voltage of the gate power supplies is higher than a predetermined value, and then the voltage level detectors 33 to 35 transmit a signal to the control circuit 26. In response to this signal, the control circuit 26 transmits a predetermined control signal as a gate signal to the pulse amplifiers 30 to 32 whose outputs are applied to the gates of the thyristors 1 through the pulse transformers 12 to 14 and the diodes 15, thus enabling the thyristors 1 to perform a required operation.

In the case where the voltage of the power supply for each of the thyristor arms drops due to a power failure or other trouble, each output voltage of the gate power supplies 23 to 25 drops but generally does not fall off at the same rate because of a slight difference in circuit parameters. In spite of this, the output voltages of the gate power supplies 23 to 25 are detected by the voltage level detectors 33 to 35, respectively. The voltage of one of the gate power supplies 23 to 25, say, the gate power supply 23, is detected to be lower than the predetermined value, with the result that a signal indicating that the output voltage of the gate power supply 23 is reduced below the predetermined value, is applied to the control circuit 26. The signal application from the control circuit 26 to the pulse amplifiers 30 to 32 is stopped, thus preventing a gate signal from being applied to each gate of the thyristors 1. The shortage of the voltage of the gate power supply 23 causes the shortage of the gate current flowing into the thyristors 1 of the thyristor unit 2, thus delaying the firing time of the thyristors 1 of the thyristor unit 2. Nevertheless, the breakdown of the associated thyristors 1 which otherwise might occur if the whole voltage is applied to them is avoided. At the time of restoration from an instantaneous power failure when the output voltages of the gate power supplies 23 to 25 fail to increase at the same rate, on the other hand, the voltage level detectors 33 to 35 detect that all the output voltages of the gate power supplies 23 to 25 have increased beyond the predetermined value. The output signal of the voltage level detectors 33 to 35 are then applied to the control circuit 26, before the signal from the control circuit 26 is applied to the pulse amplifiers 30 to 32, thus overcoming the trouble with voltage shortage of the gate power supply 23.

Although the foregoing embodiment shows the case where the voltage level detectors 33 to 35 have the same voltage detection level, alternatively, a given voltage level detector, say, 33 only may have a slightly lower detection level of voltage than the voltage level detectors 34 and 35, for example, by 10% to 30% or preferably 20%, and such an arrangement makes it feasible to keep the voltage detected by the voltage level detectors 34 and 35 at the predetermined value even in the case where an error occurs in the voltage detection level among the voltage level detectors 33 to 35 and then the voltage detected by the voltage level detector 33 is lower than the predetermined value, and thus to ensure more reliable operation of the thyristors 1.

Figure 2:
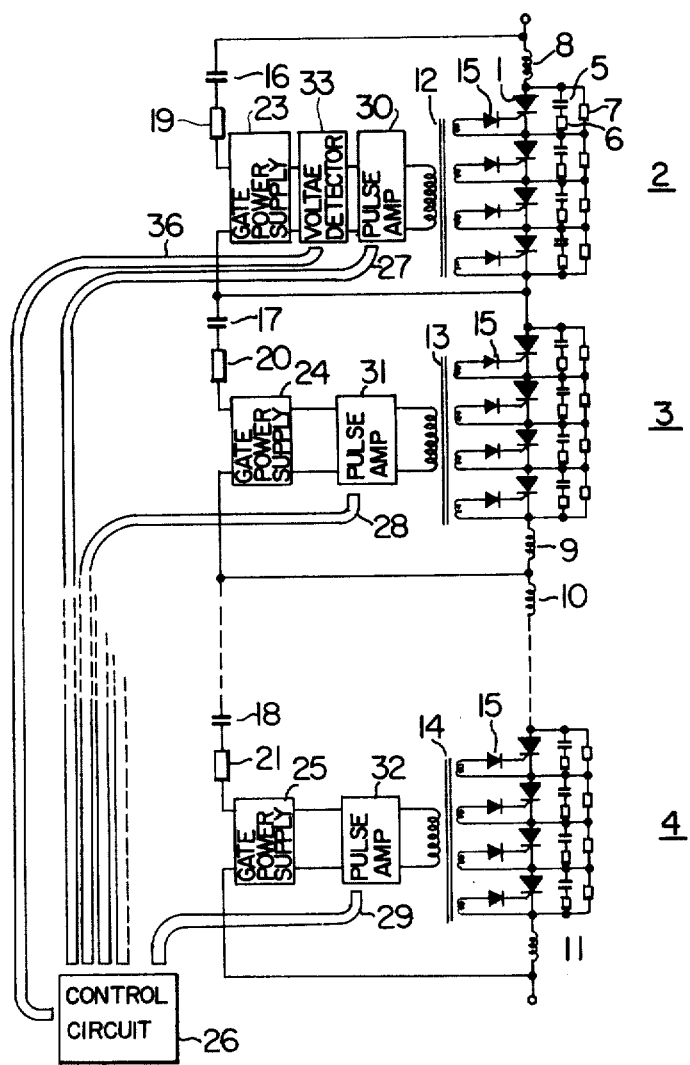
FIG. 2 is a circuit configuration diagram showing the high-voltage thyristor converter according to another embodiment of the present invention.

Another embodiment the present invention is shown in FIG. 2. The embodiment shown in this drawing is different from that shown in FIG. 1 in that, in this embodiment, a given gate power supply, say, 23 has a discharge time constant smaller than those of the other gate power supplies by, say, 10% to 30% or preferably by 20% and that a voltage level detector 33 is provided only for the gate power supply 23. Whether or not the output voltage of the gate power supply 23 is at the predetermined value is detected by the voltage level detector 33, the output of which is applied via the light guide 36 to the control circuit 26.

Figure 3:
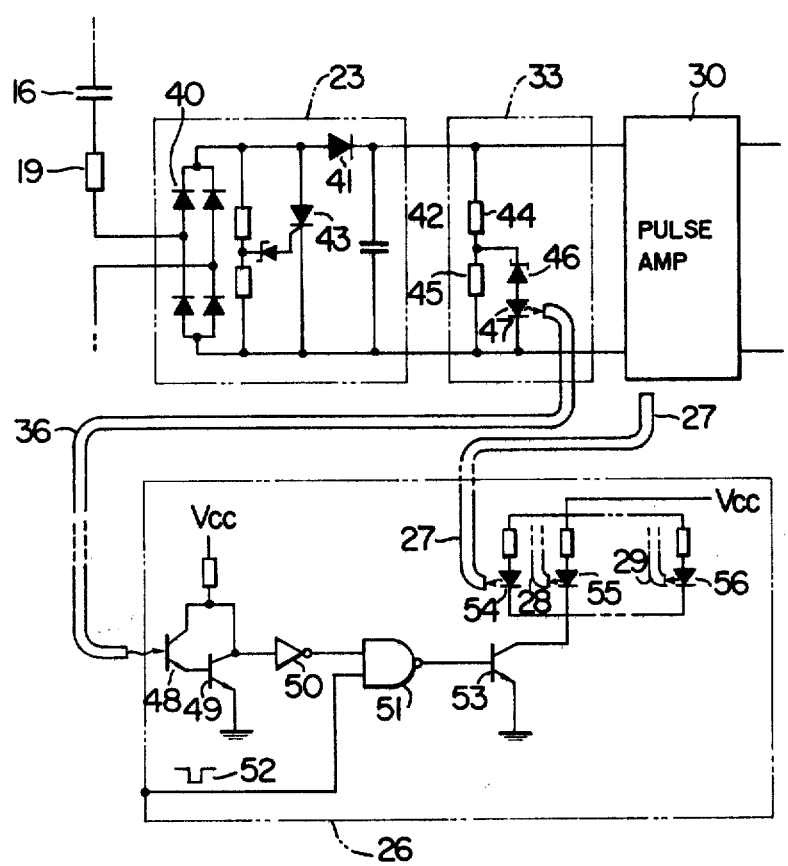
FIG. 3 is a detailed circuit diagram showing the gate control circuit for the high-voltage thyristor converter shown in FIG. 2.

A gate control circuit for the high-voltage thyristor converter shown in FIG. 2 is illustrated in FIG. 3. This diagram shows more specifically the gate power supply 23, the voltage level detector 33 and the control circuit 26. The gate power supply 23 is provided with a rectifier circuit 40 including a plurality of diodes, a diode 41 adapted to pass only a current from the rectifier circuit 40, a capacitor 42 for storing the current from the rectifier circuit 40, and a thyristor 43 so constructed as to conduct when the output voltage of the rectifier circuit 40 is higher than a predetermined value. The output voltage of the gate power supply 23 is determined by the voltage across the capacitor 42. The voltage level detector 33 is provided with resistors 44 and 45 for dividing the output voltage of the gate power supply 23, an avalanche diode 46 and a light-emitting diode 47.

When the voltage across the gate power supply 23 is higher than the predetermined value, the avalanche diode 46 conducts so that a current is supplied to the light-emitting diode 47. The light-emitting diode 47 is illuminated and applied an optical signal to the control circuit 26 via the light guide 36. When the output voltage of the gate power supply 23 is lower than the predetermined value, the avalanche diode 46 fails to conduct, so that no light is emitted from the diode 47. A signal produced from the light-emitting diode 47 is applied to the photo-transistor 48 which is included in the control circuit 26 and, in turn, applied to the transistor 49 in which it is amplified. The amplified signal is inverted by the inverter 50 and then applied to the NAND circuit 51. The control signal 52 is also applied to the NAND circuit 51, the output of which is applied to the transistor 53. The conduction of the transistor 53 causes the light-emitting diodes 54 to 56 to emit light, so that control signals are applied via the light guides 27 to 29 to the pulse amplifiers 30 to 32, respectively.

In the embodiments of FIGS. 2 and 3, the discharge time constant of the specific gate power supply 23 is rendered slightly smaller than those of the other gate power supplies 24 and 25. As long as the output voltage of the gate power supply 23 is higher than the predetermined value, the output voltages of both the gate power supplies 24 and 25 are also higher than the predetermined value, thus eliminating the need for detecting the output voltages of the gate power supplies 24 and 25. It, therefore, suffices if only the output voltage of the gate power supply 23 is detected and if only one of each of the voltage level detector and the light guide is provided. Further, since the specific gate power supply 23 and the voltage level detector 33 may be installed into the thyristor unit which is disposed at the lowest potential, the signal from the voltage level detector 33 may be transmitted to the control circuit 26 by use of ordinary signal-transferring means such as an isolation transformer, if so required.

According to the present invention, in a high-voltage thyristor converter wherein gate-drive power for each of a plurality of thyristor units is obtained from both the extreme ends of series-connected thyristors of each thyristor unit, a gate signal is applied to the thyristors only when the output voltage of the gate power supply of at least one of the thyristor units is higher than a predetermined value, thus entirely preventing the breakdown of the thyristors which otherwise might result from the application of the whole voltage to the thyristors because of a lengthened turnon time thereof due to the shortage of a gate current which in turn is caused by the drop of the output voltage of the associated gate power supply at the time of an instantaneous power failure or the like trouble.

What is claimed is:

1. A high-voltage thyristor converter comprising high-voltage converter means and gate control means, said high-voltage converter means including a plurality of series-connected thyristor units, each of said thyristor units having a plurality of series-connected thyristors and a gate-drive power supply circuit connected between both extreme ends of said series-connected thyristors for supplying gate-drive power to said thyristors, said gate control means detecting whether or not an output voltage of said gate-drive power supply circuit in at least one of said thyristor units is higher than a predetermined value and transmitting a gate signal simultaneously to all of said thyristors only when said detected output voltage of said power supply circuit is higher than said predetermined value.

2. A high-voltage thyristor converter according to claim 1, wherein said gate control means is so constructed as to detect whether or not the output voltage of the gate-drive power supply circuit of a specific one of said thyristor units is slightly higher than said predetermined value.

3. A high-voltage thyristor converter according to claim 1, wherein said gate control means is so constructed that a discharge time constant of the gate-drive power supply circuit of a specific one of said thyristor units is smaller than that of the gate-drive power circuits of all the other thyristor units, said gate control means detecting whether the output voltage of said gate-drive power supply circuit of said specific thyristor unit is at said predetermined value, said gate control means applying said gate signal to all of said thyristors only when the output voltage of said gate-drive power supply circuit of said specific thyristor unit is higher than said predetermined value.

4. A high-voltage thyristor converter according to claim 1, wherein said gate control means includes at least one voltage level detector circuit for detecting an output voltage level of said gate-drive power supply circuit, a control circuit for controlling said gate signal in response to the output of said voltage level detector circuit, and an amplifier circuit connected to said gate-drive power supply circuit of each of said units for applying gate-drive power to all of said thyristors in each of said thyristor units in response to said gate signal from said control circuit.

5. A high-voltage thyristor converter according to claim 4, wherein said control circuit is photocoupled with said voltage level detector circuit and said pulse amplifier circuit.

6. A high-voltage thyristor converter according to claim 2, wherein the output voltage of the gate-drive power supply circuit of the specific one of said thyristor units is higher than said predetermined value by approximately 10% to 30%.

7. A high-voltage thyristor converter according to claim 3, wherein the discharge time constant of the gate-drive power supply circuit of the specific one of said thyristor units is smaller by approximately 10% to 30% than that of the gate-drive power supply circuits of all the other thyristor units.

8. A high-voltage thyristor converter according to claim 4, in which said voltage level detector circuit comprises a couple of resistors and a series-connected circuit of an avalanche diode and a light-emitting diode, said resistors being connected in series between both the output terminals of said gate-drive power supply circuit, said series circuit being connected between a junction point of said resistors and one of said output terminals of said gate-drive power circuit, said series-connected circuit being adapted to produce an optical output signal when said output voltage is higher than the predetermined value.

9. A high-voltage thyristor converter according to claim 5, in which said control circuit comprises a photoelectric circuit for generating an electrical signal in response to an optical output signal from said voltage level detector circuit, a NAND circuit for controlling a gate signal from an external control source in response to said electrical signal, and an output circuit connected to said pulse amplifier circuit and transmitting an optical gate signal to said pulse amplifier circuit in response to an electrical output signal from said NAND circuit.

10. A high-voltage thyristor converter comprising high-voltage converter means and gate control means, said high-voltage converter means including a plurality of series-connected thyristor units, each of said thyristor units having a plurality of series-connected thyristors and a gate-drive power supply circuit connected between both extreme ends of said series-connected thyristors for supplying gate-drive power to said thyristors, said gate control means detecting whether or not an output voltage of said gate-drive power supply circuit in at least one of said thyristor units is at least equal to a predetermined value and transmitting a gate signal simultaneously to all of said thyristors only when said detected output voltage of said power supply circuit is at least equal to said predetermined value.

11. A high-voltage thyristor converter according to claim 10, wherein said gate control means is so constructed that a discharge time constant of the gate-drive power supply circuit of a specific one of said thyristor units is smaller than that of the gate-drive power circuits of all the other thyristor units, said gate control means detecting whether the output voltage of said gate-drive power supply circuit of said specific thyristor unit is at least equal to said predetermined value, said gate control means supplying said gate signal to all of said thyristors only when the output voltage of said gate-drive power supply circuit of said specific thyristor unit is at least equal to said predetermined value.

12. A high-voltage thyristor converter according to claim 11, wherein the discharge time constant of the gate-drive power supply circuit of the specific one of said thyristor units is smaller by approximately 10% to 30% than that of the gate-drive power supply circuits of all the other thyristor units.

13. A high-voltage thyristor converter according to claim 10, wherein said gate control means includes at least one voltage level detector circuit for detecting an output voltage level of said gate-drive power supply circuit, a control circuit for controlling said gate signal in response to the output of said voltage level detector circuit, and an amplifier circuit connected to said gate-drive power supply circuit of each of said units for applying gate-drive power to all of said thyristors in each of said thyristor units in response to said gate signal from said control circuit.

* * * * *